United States Patent Office 3,669,828
Patented June 13, 1972

3,669,828
METHOD FOR PREPARING COLORED RUBBER LAMINATES
Teruyoshi Usamoto, Higashiosaka, Masao Yokota, Ibaraki, and Tamotu Kondo, Toyonaka, Japan, assignors to Sumitomo Chemical Company, Limited, Osaka, Japan
No Drawing. Filed June 11, 1969, Ser. No. 832,887
Claims priority, application Japan, June 21, 1968, 43/43,268
Int. Cl. B32b 27/20; C09j 5/00
U.S. Cl. 161—252
6 Claims

ABSTRACT OF THE DISCLOSURE

A colored rubber is prepared by sticking together vulcanized and semi-vulcanized rubbers containing an ethylene-propylene rubber and an inorganic filler into which a coloring and cross-linking agent has been blended, and vulcanizing the resulting assembly.

---

The present invention relates to a process for producing a colored rubber of ethylene-propylene. Particularly, the invention is concerned with a process for producing a clearly colored rubber, which comprise producing a colored composition of an ethylene-propylene rubber, sticking together a vulcanized rubber and a semi-vulcanized rubber of said colored composition and vulcanizing the resulting assembly without making the vulcanized rubber get out of shape or subjecting it to deformation.

Rubbers prepared by blending natural rubber and synthetic rubber, for example, styrene-butadiene rubber, polybutadiene rubber, etc. with an inorganic filler are poor in weather resistance and ozone resistance, and consequently, cracks are brought about on the rubber surface. Particularly, when an inorganic filler is employed, the results are not good. Chloroprene rubber which is said to be relatively good in weather resistance as compared with natural rubber is effective only when a filler used is carbon black or an inorganic filler and black pigment are used together. However, colored rubbers other than black rubber, which have been prepared by using this chloroprene rubber, is markedly discolored due to ultraviolet rays, and it is believed that this discoloration cannot absolutely be improved any more because of the essential efficiency of the chloroprene rubber.

For imparting color patterns to natural rubber or synthetic rubbers, for example, styrene-butadiene rubber and chloroprene rubber, it is usual method to apply color patterns to the rubber by abrasing the surface of vulcanized rubber or sticking color patterns thereon using an adhesive.

Also, as the simplified method for imparting color patterns to the rubber, there is employed a method which comprises coloring the surface of rubber with paints.

These methods, however, have such drawbacks that the adhesive to be employed is expensive, and that the paints are apt to peel away from the rubber surface, and consequently the rubber surface is markedly soiled. Accordingly, most of conventional rubber articles have been in black color.

The ethylene-propylene rubber is excellent in weather resistance, ozone resistance, thermal resistance and chemical resistance as compared with conventional natural rubber and other synthetic rubbers, for example, styrene-butadiene rubber, polybutadiene rubber, chloroprene rubber and the like. Moreover, the ethylene-propylene rubber has clearness when colored with pigments and dyes, and the rubber less in discoloring and fading can be obtained therefrom.

However, it has been difficult to obtain manufactured goods of clearly colored rubber because the ethylene-propylene rubber is poor in adhesivity and also on account of unavailability of excellent adhesives because of non-polarity of the ethylene-propylene rubber.

The present inventors extensively studied a method for imparting color patterns to the rubber without using an adhesive, and as a result, they have attained the present invention.

The present invention is directed to a process for producing a colored rubber having clearness and not being subject to getting out of shape or deformation of the vulcanized rubber thereof by utilizing the flat vulcanization property of a composition of the ethylene-propylene rubber blended with an inorganic filler, which comprises sticking together a colored vulcanized rubber of the said composition and rubber prepared by semi-vulcanizing the said colored composition in such a manner that the said colored composition may not flow during vulcanization, and vulcanizing the resulting assembly.

The ethylene-propylene copolymer and the ethylene-propylene-ternary-copolymer used in the present invention are produced according to a well-known method using a catalyst well-known in the field of the art to which the present invention pertains, particularly using a Ziegler-Natta type catalyst. Representative examples of the non-conjugated diene compound which constitutes an ethylene-propylene-non-conjugated diene ternary copolymer include 1,4-hexadiene, dicyclopentadiene, 5-methylene-2-norbornene, 5-ethylidene-2-norbornene, 4,7,8,9-tetrahydroindene, and the like.

The ethylene-propylene rubber composition of the present invention is prepared by blending 100 parts by weight of an ethylene-propylene rubber with 50–300 parts by weight of an inorganic filler and a cross-linking agent such as sulfur or an organic peroxide and further with a desired coloring agent, but, if necessary, the present composition may be blended with a process oil, a plastisizer and the like.

The inorganic filler which can be used in the present invention is a natural or synthetic inorganic filler. For example, it includes calcium carbonates, clays, talcs, silica, silicates and oxides of titanium, zinc, aluminum, etc. The coloring is effected by using organic dyes and pigments, and inorganic pigments, and these substances may be blended in amounts necessary for a desired color matching. When the amount of white inorganic filler to be blended is less than 50 parts by weight per 100 parts by weight of the ethylene-propylene rubber, the reinforcing effect expected becomes poor. On the contrary, when the amount of the inorganic filler is more than 300 parts by weight, the filling thereof into the rubber becomes difficult.

The cross-linking agent useful in the present invention includes organic peroxides, oxime compounds and sulfur. These substances may be used alone or in combination. The organic peroxides to be used include dicumyl peroxide, 2,5-dimethyl-2,5-di(tert.-butylperoxy) hexylene and the like. The oxime compounds include p-quinonedioxime, p,p' - benzoylquinonedioxime and the like. When only sulfur is used as a cross-linking agent, the use of conventionally used vulcanization accelerator and activator becomes necessary therefor. However, said sulfur blending agent is useful only for an ethylene-propylene ternary copolymer.

The semi-vulcanization of the present invention can be effected by treating the blend at a temperature of 120–200° C., preferably 140–160° C. for a short period of time. The degree of semi-vulcanization is desirably within the range of 300–500% of weight increase rate after immersion of the semi-vulcanized rubber in benzene at 25°

C. for 48 hours. When vulcanization proceeds over the above degree, no adhesion is attained or even when adhered, the adhered surface bends to cause deformation. Furthermore, if vulcanization is effected below the above degree, the rubber flows when adhered and whereby the rubber puts out of shape, and the desired object cannot be attained.

Weight increase rate is calculated on the basis of the following equation.

Weight increase rate (percent)
$$= \frac{\text{weight after swelling}}{\text{weight before swelling}} \times 100$$

The adhesion method of the colored rubber sheet of the present invention is explained hereinafter. The aforesaid composition obtained by kneading with an ordinary open roll or a Banbury mixer is extruded into any desired shape according to any of known method, for example, using a calendar roll or an extruder and the extruded product is subjected respectively to semi-vulcanization and usual vulcanization. The method for vulcanization is not particularly limited, and it can be effected at the heating temperature ranging from 120 to 200° C. according to a compression molding using a heat press, direct steam vulcanization method using steam or indirect vulcanization method using hot air depending upon the shape of the article desired. The thus obtained vulcanized rubber and semi-vulcanized rubber are adhered by heating the two rubbers stuck together at a temperature ranging from 140 to 200° C., preferably from 140 to 160° C. with a heat press.

The mold goods obtained according to the present invention have excellent adhesivity, coloring of any desired colors and exhibit precise color patterns, and whereby such products as could not be obtained from conventional rubbers can be obtained simply.

Furthermore, the present products have excellent feature in weather resistance and ozone resistances, and therefore, they are suitable for use in industrial accessories, automobile parts and the like articles.

The present invention is explained with reference to the following examples, but these examples are not given to limit the process of the present invention.

Furthermore, in all the following examples and reference examples, the ozone resistance test was carried out using an ozone weather meter manufactured by Toyo Rika under the conditions of ozone concentration of 60 pphm, elongation percent of 20%, and temperature of 50° C. The weather resistance was determined using a weather tester (carbon arc type) manufactured by Shimazu Seisakusho under the conditions of elongation percent of 20%, panel temperature of 60° C. and cycle of 18 min. rain-fall/2 hrs. The peeling-off test was conducted on a specimen having a long rectangular form obtained by cutting a colored rubber sheet using Chopper's tipe tensile tester at a tension rate (180° peeling) of 500 mm.

EXAMPLE 1

The following composition A and B were produced using an ethylene - propylene-non-conjugated terniary copolymer (Royalene 301, produced by Uniroyal Co.) with use of a 8″ roll for rubber. The blending ratios are all represented by part by weight.

| | A | B |
|---|---|---|
| Ethylene-propylene rubber | 100 | 100 |
| Stearic acid | 1 | 1 |
| Zinc oxide | 5 | 5 |
| Sulfur | 1.5 | 1.5 |
| Hard clay | 80 | 80 |
| Titanium dioxide | | 35 |
| Paraffinic oil | 10 | 10 |
| Titanium nickel yellow (titanium yellow) | | 2.0 |
| Phthalocyanine Blue-B | 3.0 | |
| Zinc dimethyldithiocarbamate | 0.75 | 0.75 |
| Tetramethylthiuram disulfide | 0.75 | 0.75 |
| 2-mercaptobenzothiazol | 0.5 | 0.5 |

Composition A was vulcanized at 160° C. for 10 minutes using a hot press and thereby to prepare a sheet of rectangular form. Subsequently, composition B was semi-vulcanized at 160° C. for 5 minutes in such a manner that the shape thereof may be able to pattern composition A. Finally, the two compositions were stuck together and the resulting assembly was vulcanized at 160° C. for 30 minutes to obtain a colored rubber having clear color shade.

Reference Example 1

The following composition C and D were produced using natural rubber.

Composition C was vulcanized and thereby to prepare a sheet of rectangular form. Subsequently, composition D was semi-vulcanized in such a manner that the shape thereof may be able to pattern composition C. Finally, the two compositions were stuck together and the resulting assembly was vulcanized.

| | C | D |
|---|---|---|
| Natural rubber (pale crepe) | 100 | 100 |
| Zinc oxide | 40 | 40 |
| Stearic acid | 1 | 1 |
| Titanium dioxide | 40 | 40 |
| Wax | 1 | 1 |
| Sulfur | 2.5 | 2.5 |
| N-cyclohexylbenzothiazolsulphenamide | 0.5 | 0.5 |
| Phthalocyanine Blue-B | 3 | |

The adhesion strength, surface state, weather resistance and ozone resistance determined respectively on C–D compound rubber and A–B compound rubber obtained in Example 1 are shown in Table 1.

Furthermore, the natural rubbers were found to be difficult to adhere to each other because of difficulty in controlling the vulcanization rate, but such rubber which could be regarded as being adhered was tested.

TABLE 1

| | Ethylene-propylene rubber | Natural rubber |
|---|---|---|
| Adhesion strength | Rubber surface ruptured. | Rubber surface ruptured. |
| Surface state of vulcanized rubber | Clear color shade. | Unclear color shade and zigzagged. |
| Ozone resistance, time required for occurrence of crack (60 p.p.h.m. elongation 20%, temperature 50° C.). | No change even after the lapse of 2,000 hours. | 30 minutes. |
| Weather tester (carbon arc type), time required for occurrence of crack (20% elongation). | No change even after the lapse of 2,000 hours. | 24 hours. |

EXAMPLE 2

The following compositions E and F were produced from an ethylene-propylene-non-conjugated diene ternary copolymer (Royalene 301, produced by Uniroyal Co.) using an 8″ roll for rubber.

The blending ratios are all represented by part by weight.

| | E | F |
|---|---|---|
| Ethylene-propylene rubber | 100 | 100 |
| Stearic acid | 1 | 1 |
| Treated, complex aluminum silicate (Translink-37) | 80 | 80 |
| Titanium dioxide | | 35 |
| Parafinic oil | 10 | 10 |
| Titanium nickel yellow (titanium yellow) | | 2 |
| Phthalocyanine green | 3 | |
| Dicumylperoxide (Di Cup 40 C) | 7.0 | 7.0 |
| Sulfur | 0.3 | 0.3 |
| Zinc oxide | 5.0 | 5.0 |

The specimen of composition E was vulcanized at 160° C. for 10 minutes using a hot press and thereby to prepare a circular sheet. Subsequently, composition F was semi-vulcanized at 160° C. for 5 minutes in such a manner that the shape thereof may be able to permit composition E be patterned. Finally, the two compositions were stuck together and the resulting assembly was vulcanized at 160° C. for 30 minutes and thereby to obtain a colored rubber having clear color shade.

Reference Example 2

The following compositions G and H were produced using a chloroprene rubber. Composition G was vulcanized and thereby to prepare a circular sheet. Subsequently, composition H was semi-vulcanized in such a manner that the shape thereof may be able to make composition G be patterned. Finally, the two compositions were stuck together and the resulting assembly was vulcanized.

|  | G | H |
|---|---|---|
| Chloroprene rubber | 100 | 100 |
| Magnesia | 4 | 4 |
| Zinc oxide | 5 | 5 |
| Stearic acid | 1 | 1 |
| Hard clay | 50 | 50 |
| Titanium dioxide | 10 | 30 |
| Paraffinic oil | 10 | 10 |
| Wax | 2 | 2 |
| Styrenated phenol | 1 | 1 |
| 2-mercaptoimidazoline | 0.5 | 0.5 |
| Phthalocyanine Blue-B | 3 |  |

The adhesion strength, surface state, weather resistance and ozone resistance determined respectively on G-H compound rubber and E-F compound rubber obtained in Example 2 are shown in Table 2.

Furthermore, the chloroprene rubber was also found to be difficult to adhere likewise in the case of the natural rubbers, but such rubber as can be regarded as being adhered was tested.

TABLE 2

|  | Ethylene-propylene rubber | Chloroprene rubber |
|---|---|---|
| Adhesion strength | Rubber surface ruptured. | Rubber surface ruptured. |
| Surface state of vulcanized rubber | Clear color shade. | Unclear color shade and bended. |
| Ozone resistance, time required for occurrence of crack (60 p.p.h.m., elongation rate 20%, temperature 50°C.) | No change even after the lapse of 2,000 hours. | 50 hours. |
| Weather tester (carbon arc type) Time required for occurrence of crack (20% elongation). | No change even after the lapse of 2,000 hours. | 100 hours. |

EXAMPLE 3

The following compositions I and J were produced from an ethylene-propylene copolymer rubber (Dutral N/C., produced by Monte Edison Co.) using an 8" roll for rubber. The blending ratios are all represented by part by weight.

|  | I | J |
|---|---|---|
| Ethylene-propylene rubber | 100 | 100 |
| Stearic acid | 1 | 1 |
| Treated, complex aluminum silicate (Translink-37) | 80 | 80 |
| Titanium dioxide |  | 35 |
| Paraffinic oil | 10 | 10 |
| Inorganic pigment (Tipaque TY-70) |  | 2 |
| Inorganic pigment (YE-637-D) | 3 |  |
| Dicumyl peroxide (Di Cup 40 C) | 7.0 | 7.0 |
| Sulfur | 0.3 | 0.3 |
| Zinc oxide | 5.0 | 5.0 |

Composition I was vulcanized at 160° C. for 10 minutes using a hot press and thereby to prepare a circular sheet. Subsequently, composition J was semi-vulcanized at 160° C. for 5 minutes in such a manner that the shape thereof may be able to make composition I be patterned. Finally, the two specimens were stuck together and the resulting assembly was vulcanized at 160° C. for 30 minutes and thereby to obtain a colored rubber having clear color shade. The adhesion strength, surface state, weather resistance and ozone resistance determined on the colored rubber are shown in Table 3.

TABLE 3

|  | J-I compound rubber |
|---|---|
| Adhesion strength | Rubber surface ruptured. |
| Surface state of vulcanized rubber | Clear color shade. |
| Ozone resistance, time required for occurrence of crack (60 p.p.h.m., elongation 20%, temperature 50° C.). | No change even after the lapse of 2,000 hours. |
| Weather tester (carbon arc type), time required for occurrence of crack (elongation 20%). | No change even after the lapse of 2,000 hours. |

EXAMPLE 4

The following compositions K, L, M and N were produced from an ethylene-propylene-non-conjugated diene ternary copolymer (Royalene 301 or 501, produced by Uniroyal Co.) using a 8" roll for rubber. The blending ratios are all represented by part by weight.

|  | K | L | M | N |
|---|---|---|---|---|
| Ethylene-propylene rubber (Royalene 301) | 100 | 100 |  |  |
| Ethylene propylene rubber (Royalene 501) |  |  | 100 | 100 |
| Stearic acid | 1 | 1 | 1 | 1 |
| Zinc oxide | 5 | 5 | 5 | 5 |
| Sulfur | 1.5 | 1.5 | 1.5 | 1.5 |
| Hard clay | 80 | 80 | 150 | 150 |
| Titanium dioxide |  | 35 |  | 35 |
| Paraffinic oil | 10 | 10 | 30 | 30 |
| Inorganic pigment (Tipaque TY-70) |  |  | 2.0 | 2.0 |
| Organic pigment (Cyanine Blue-HB) | 3.0 | 3.0 |  |  |
| Zinc dimethyldithiocarbamate | 0.75 | 0.75 | 0.75 | 0.75 |
| Tetramethylthiuram disulfide | 0.75 | 0.75 | 0.75 | 0.75 |
| 2-mercaptobenzothiazol | 0.5 | 0.5 | 0.5 | 0.5 |

Compositions K and M were respectively vulcanized at 160° C. for 10 minutes using a hot press and thereby to prepare the respective sheets of rectangular form. Subsequently, compositions L and N were respectively semi-vulcanized at 160° C. for 5 minutes in such a manner that the shapes of compositions L and N may be able to make compositions K and M be patterned.

Finally, compositions K and L, and M and N were respectively stuck together and the resulting assemblies were respectively vulcanized at 160° C. for 30 minutes and thereby to obtain the respective colored rubbers having clear shade.

The adhesion strength, surface state, weather resistance and ozone resistance of the respective colored rubbers are shown in Table 4.

TABLE 4

|  | K-L compound rubber | M-N compound rubber |
|---|---|---|
| Adhesion strength | Rubber surface ruptured. | Rubber surface ruptured. |
| Surface state of vulcanized rubber. | Clear color shade. | Clear color shade. |
| Ozone resistance, time required for occurence of crack (60 p.p.h.m., elongation 20%, temperature 50° C.). | No change even after the lapse of 2,000 hours. | No change even after the lapse of 2,000 hours. |
| Weather tester (carbon arc type), time required for occurence of crack (20% elongation). | No change even after the lapse of 2,000 hours. | No change even after the lapse of 2,000 hours. |

As is clear from the results mentioned-above, colored sheets obtained by the process of the present invention are clearly printed and have superior adhesive strength. Thus, a rubber obtained in accordance with the present invention is suitable for outer hoods for vehicles which need weather resistance and ozone resistance as well as clear color tone.

We claim:

1. A process for producing a rubber article having clearly defined colored areas comprising preparing a blend of ethylene-propylene rubber, inorganic filler, coloring agent and cross-linking agent, semi-vulcanizing said blend, preparing a second such blend and vulcanizing said second blend, thereafter laminating the said semi-vulcanized blend to the said second vulcanized blend, and vulcanizing the resulting assembly.

2. A process as in claim 1 in which the coloring agent in the semi-vulcanized blend is different from the coloring agent in the second blend, and the semi-vulcanized blend is laminated in a desired pattern to the second blend to produce a multi-tone assembly.

3. A process as in claim 1 in which the semi-vulcanized blend increases in weight by 300–500% when immersed in benzene at 25° C. for 48 hours.

4. A process as in claim 1 in which the amount of inorganic filler is from 50 to 300 parts per 100 parts by weight of ethylene-propylene copolymer.

5. A process as in claim 1 in which the ethylene-propylene rubber is ethylenepropylene-non-conjugated diene terpolymer rubber.

6. A colored laminate produced according to the method of claim 1.

References Cited

UNITED STATES PATENTS

| | | | |
|---|---|---|---|
| 1,836,660 | 12/1931 | Haertel | 117—80 |
| 2,308,724 | 1/1943 | Stamberger | 161—240 |
| 2,838,854 | 9/1954 | Dosmann | 36—4 |

LELAND A. SEBASTIAN, Primary Examiner

U.S. Cl. X.R.

156—306, 308; 161—168; 260—41 B